United States Patent [19]

Cailloux

[11] 4,186,435
[45] Jan. 29, 1980

[54] DEVICE FOR CONTROLLING A GRAETZ RECTIFIER BRIDGE

[75] Inventor: Michel Cailloux, Belfort, France

[73] Assignee: CGEE Alsthom, Levallois Perret, France

[21] Appl. No.: 888,902

[22] Filed: Mar. 22, 1978

[30] Foreign Application Priority Data

Mar. 25, 1977 [FR] France ............... 77 08962

[51] Int. Cl.² .................................... H02M 5/45
[52] U.S. Cl. ............................... 363/37; 318/345 G; 318/722; 363/96
[58] Field of Search .......... 318/345 R, 345 C, 345 G, 318/722, 723; 363/34, 37, 96, 136, 137

[56] References Cited

U.S. PATENT DOCUMENTS

| 3,612,973 | 10/1971 | Kuniyoshi | 363/137 X |
| 3,719,873 | 3/1973 | Graf | 363/137 X |
| 4,008,421 | 2/1977 | Bird | 318/722 |
| 4,028,607 | 6/1977 | Watanabe | 363/96 X |

Primary Examiner—William M. Shoop
Attorney, Agent, or Firm—Sughrue, Rothwell, Mion, Zinn and Macpeak

[57] ABSTRACT

The invention comes within the field thyristor bridge control.

A device for controlling a Graetz rectifier bridge for driving a synchronous machine which operates at variable speed, it being connected to this machine by its AC terminals and its voltage at the terminals being substantially proportional to its frequency, characterized in that the firing pulses of each thyristor of the Graetz rectifier bridge come from the comparison of a control signal $U_c$ chosen as a function of the required firing angle $\alpha$ of the thyristor to be fired, with a sinusoidal phase reference curve whose amplitude is made independent from the operation frequency of the Graetz rectifier bridge.

The invention applies in particular to the driving of synchronous rotating machines which operate at variable speed.

8 Claims, 5 Drawing Figures

DEVICE FOR CONTROLLING A GRAETZ RECTIFIER BRIDGE

The invention relates to a device for controlling a Graetz rectifier bridge for driving a synchronous machine which operates at variable speed. The bridge is connected by its AC terminals to the machine and its voltage is substantially proportional to the frequency.

In the usual case of operation at fixed speed and hence at fixed frequency, a sinusoidal signal is obtained directly from the three-phase voltages which exist on the AC side of the Graetz bridge and is frequently used in combination with a control voltage $U_c$ as a phase reference signal to define the position of the firing pulse of each thyristor, i.e. to define the firing angle $\alpha$; the abscissa of the intersection of the two curves defining the firing angle $\alpha$. These reference voltages are for example generally obtained by means of potential transformers. Filtering is then provided on these reference signals so as to avoid any danger of inadvertent emission of firing pulses resulting from the appareance of interference on the AC side of the bridge. In fixed frequency operation, such filtering causes no difficulty.

Further, when the bridge operates as an inverter, the variation of the firing angle $\alpha$ must be checked. For example, if the voltage decreases at the terminals of the machine, the amplitude of the phase reference also decreases and, for a fixed value of the control voltage $U_c$, the firing angle $\alpha$ increases, therefore the angle $\gamma$ decreases. Likewise, if the current increases, the switching angle $\mu$ also increases and the clearance angle $\gamma$ decreases. In the known fixed frequency case it is necessary to replace the normal control signal when its sign corresponds to the machine working as a motor by a control signal derived from the algebraic sum of the image of the direct current $I_c$ flowing through the bridge and the sign-inverted image of the sum of the rectified three-phase voltages.

When operating at variable frequency, for example to supply a synchronous motor operating at variable speed and used at constant induction, i.e. in which the voltage at the terminals is substantially proportional to the frequency, the amplitude of the phase reference signals which are in principle sinusoidal and which are used to define the position of the firing pulses varies greatly with frequency, thus causing difficulties when deriving the control voltage $U_c$. Further, these phase reference signals are very greatly disturbed by the phase switching in the bridge. This is particularly the case when the synchronous machine is connected directly to the bridge without any intervening inductive component. The potential transformers must then be connected directly to the terminals of the bridge, and the switching which, at least in principle, does not disturb the operation of the control of the gates of the thyristors since the disturbance produced by switching is subsequent to the emission of the firing pulse is, however, a great hindrance with respect to the operation of some auxiliary devices. Now, the filtering of the reference signals, such as it is usually practised in the controlling of gates which are intended to operate at a fixed frequency, becomes inapplicable in the case of operation at variable frequency.

Preferred embodiments of the present invention mitigate these disadvantages.

The present invention provides a device for controlling a Graetz rectifier bridge for connection by its AC terminals to a synchronous machine which operates at variable speed, the voltage at the terminals being substantially proportional to its frequency, wherein a control signal $U_c$ is chosen as a function of the required firing angle $\alpha$ for the thyristors to be fired and the firing pulses of each thyristor of the Graetz rectifier bridge are derived from a comparison of the control signal $U_c$ with a sinusoidal phase reference signal curve whose amplitude is made independent from the operating frequency of the Graetz rectifier bridge.

According to one embodiment of the invention, the various sinusoidal phase reference signal curves are obtained by generating signals which are images of the simple voltages of the three phases of the machine connected to the AC terminals of the bridge, each image signal being applied to an integrator circuit, then to a phase shifting circuit so as to be phase shifted by $\pi/3$ in advance of the voltage of the phase for which the reference signal is intended and which supplies the thyristor to be fired.

Thus, a constant amplitude reference signal is obtained by means of the integrator circuit: indeed, on integrating a sinusoidal function, there appears a coefficient in $1/\omega$, $\omega$ being the angular frequency, and since $\omega = 2\pi F$, the amplitude of the signal at the output of the integrator circuit is inversely proportional to the frequency, but since the amplitude of the three-phase voltage connected to the bridge is on the contrary proportional to the frequency, a signal with constant amplitude is obtained finally at the output of the integrator, whatever the frequency may be; it is then easy to regulate the control voltage $U_c$ as a function of the required thyristor firing angle $\alpha$.

Further, also due to the term in $1/\omega$ at the output of the integrator circuit, the harmonics of order 5, 7, 11, 13, etc., which appear at the time of switching, are filtered.

Preferably the device further comprises means for producing, for each phase connected to the bridge, an image of the inductive drop of said phase and an image of its ohmic drop, these two images being introduced into said integrator circuit by means of a summing circuit together with the image of the voltage of the same phase taken at the terminals of the bridge.

In this way, an improvement of the form of the signals leaving the integrator is obtained.

It is also well known that the switching duration $\mu$ expressed in electrical degrees and corresponding to any value of the direct current $I_c$ flowing through the bridge ceases to be constant and tends to increase when the frequency falls below a certain level.

Thus, the image of the direct current $I_c$ flowing through the bridge can be fictitiously increased in accordance with an inverse function of the frequency of the machine before being summed algebraically with the sign-inverted image of the sum of the rectified three-phase voltage of the machine.

An embodiment of the invention is described by way of example with reference to the accompanying drawings in which.

Figure 1:
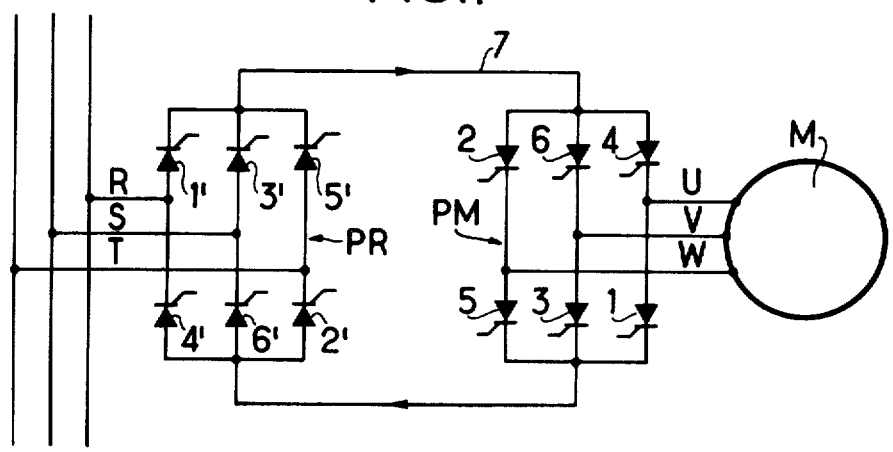
FIG. 1 shows a static converter supplying a synchronous motor.

On referring to FIG. 1, it will be seen that a three-phase mains R, S, T is connected to a Graetz thyristor rectifier bridge whose thyristors are referenced respectively 1', 2', 3', 4', 5' and 6'. This bridge is referred to as a "mains bridge" and is referenced PR. The mains bridge is connected by its DC terminals to a second Graetz rectifier bridge referred to as the "machine bridge" and referenced PM; it includes six thyristors referenced 1, 2, 3, 4, 5 and 6. The three AC terminals of the machine bridge are connected to the three phases U, V and W of a synchronous machine referenced M.

The synchronous machine M can operate either as a motor or as an alternator. In the first case, the bridge PR operates as a rectifier and the bridge PM operates as an inverter; in the second case, the bridge PM operates as a rectifier and the bridge PR operates as an inverter. It is sufficient, for that purpose, to vary the firing angle $\alpha$ (FIG. 2) of the thyristors in order to invert the polarity of the DC terminals of the bridges. Since the direction of the current in the DC loop 7 cannot change, the power transmitted goes either from the mains towards the machine or from the machine towards the mains.

A first aim of the invention is to produce a phase reference signal for controlling the firing of the thyristors of the bridge PM, it being assumed that the synchronous machine M operates at a variable frequency and at a substantially constant flux, i.e. that the voltage at its terminals is substantially proportional to its frequency.

It is known that the successive configurations of the bridge PM are as follows, where the successive voltages which appear at the DC terminals of the bridge PM are referenced E, the subscript which corresponds to the phase being assigned thereto.

(1) $E_U$-$E_W$ thyristors 1 and 2 conductive
(2) $E_V$-$E_W$ thyristors 2 and 3 conductive
(3) $E_V$-$E_U$ thyristors 3 and 4 conductive
(4) $E_W$-$E_U$ thyristors 4 and 5 conductive
(5) $E_W$-$E_V$ thyristors 5 and 6 conductive
(6) $E_U$-$E_V$ thyristors 6 and 1 conductive It is observed that, on passing from one configuration to another, one of the two conductive phases will be conductive also in the following configuration but that the other phase will switch with the third which was previously open circuit.

Figure 2:
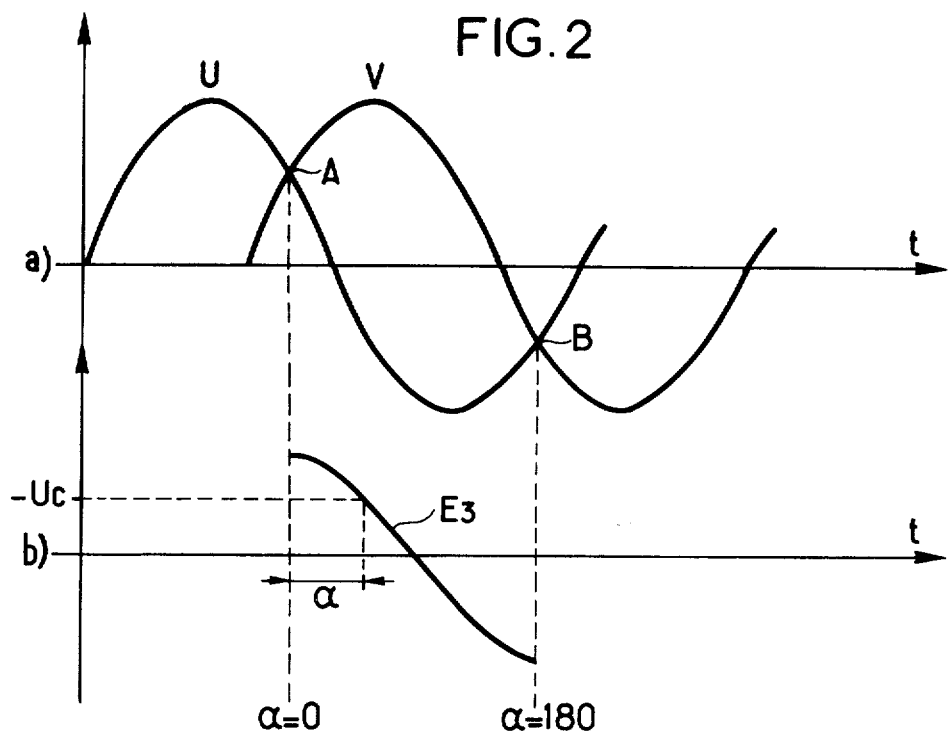
FIG. 2 shows, as a function of time, the simple voltage of two of the 3 phases connected to the terminals of the bridge and of the reference signal used for switching from one phase to another.

FIG. 2 shows the amplitude along the axis a and as a function of time of the respective voltages of the phases U and V at the terminals of the bridge PM. The thyristor 3 must be fired, making the bridge change from the configuration $E_U$-$E_W$ to the configuration $E_V$-$E_W$, i.e. the phase V is put in the DC circuit 7 instead of the phase U in the preceding configuration.

The possible zone in which the thyristor 3 may be fired extends, as is known, from point A to point B, defining a firing angle $\alpha$ of 0° to 180°.

The phase reference signal $E_3$ for firing the thyristor 3 is shown on line (b).

Figure 3:
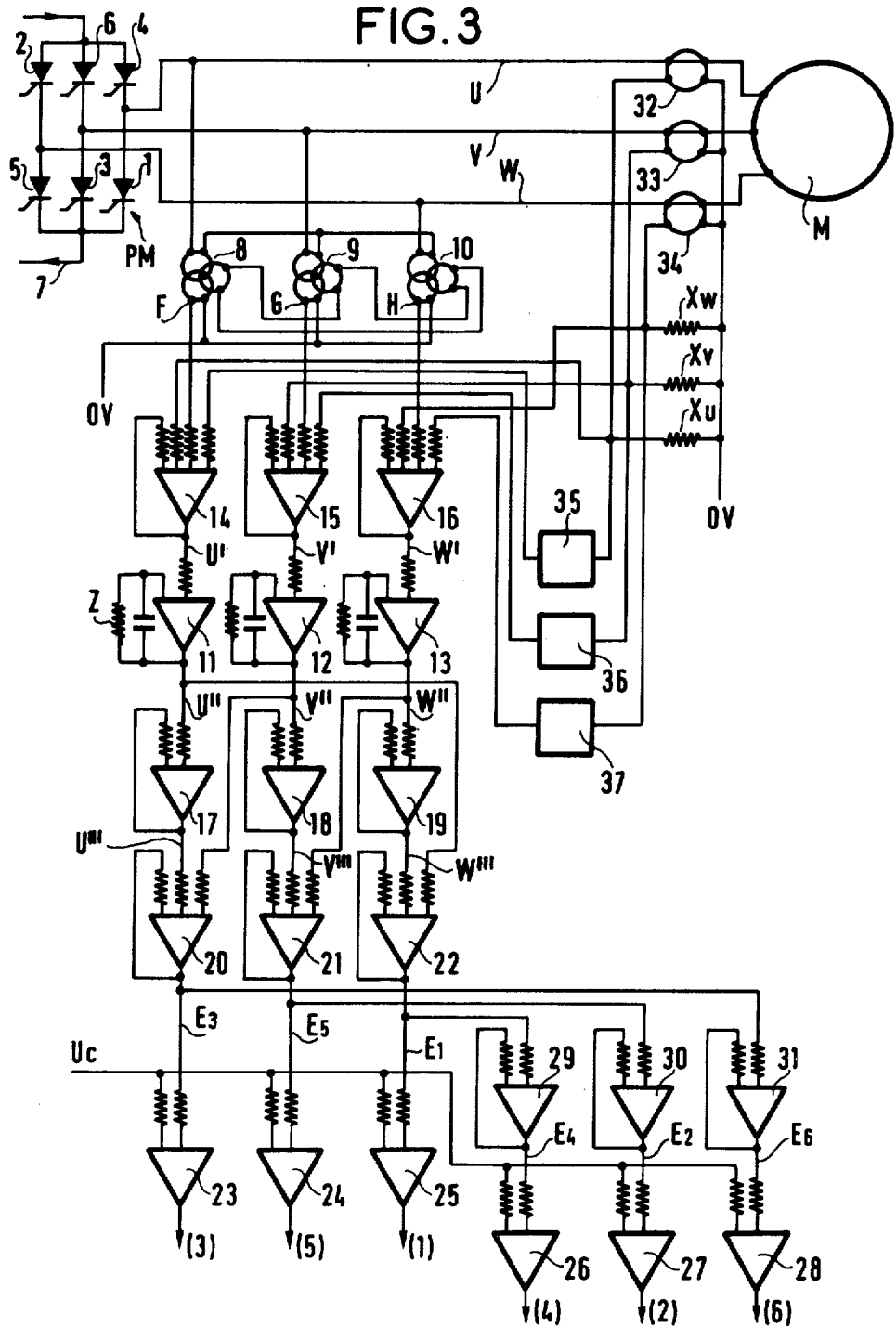
FIG. 3 shows the device in accordance with the invention which makes it possible to obtain the phase reference signals.

This reference signal $E_3$, which is 60° in advance in relation to the voltage of the phase V, is produced by the voltage of the phase U by means of a potential transformer 8 (FIG. 3).

A first aim of the invention consists in making the amplitude of this reference signal $E_3$ constant whatever the speed of the machine M may be, i.e. whatever the frequency of the three-phase system U, V, W may be.

The firing pulse is sent on the thyristor 3 when the value of the phase reference signal $E_3$ crosses the value of the control voltage $U_c$. In this figure, the comparison is made between $E_3$ and $-U_c$. This figure shows that if the machine bridge M operates as a rectifier, $-U_c$ is positive, therefore $U_c$ is positive when the bridge PM operates as an inverter, hence when the machine M operates as a motor.

FIG. 3 shows generally the device in accordance with the invention. This figure shows exclusively the machine bridge PM and the synchronous machine M.

The devices producing the phase reference signal include potential transformers 8, 9 and 10 whose primary windings are connected respectively to the phases R, V and W and star connected and whose secondary windings are also star connected, the neutral conductor being connected to zero potential. Each of these transformers also includes a tertiary winding, these tertiary windings being connected to one another in a triangular configuration. These tertiary windings aim to fix rigidly the potential of the secondary neutral point.

Thus, respective images of the voltages of the phases U, V and W are obtained on the terminals F, G and H of the secondary windings of the transformer 8, 9 and 10.

These images are sent respectively to integrator circuits 11, 12 and 13 by means of summing circuits 14, 15 and 16 whose function will be set forth hereinbelow. The integrator circuits are constituted by operational amplifiers which include an input resistor and a negative feed-back capacitor. In the same way, the summing circuits are constituted by operational amplifiers which include input resistors and a negative feed-back resistor.

At the output of these integrators, signals are therefore obtained which are the integrals of the images of the phase voltages U, V and W; since the voltages are sinusoidal voltages, the amplitude of the signals at the output of the integrators comprises a term in $1/\omega$ and since the machine M operates with a substantially constant flux, i.e. at a voltage which is substantially proportional to the frequency, the amplitude of the signals at the output of the integrators is constant.

Then, it is necessary only to adjust the phase of these signals properly in relation to the phase of the voltage U, V and W. This adjustment is made by means of the inverters 17, 18 and 19 and of the summing inverters 20, 21 and 22.

Figure 4:
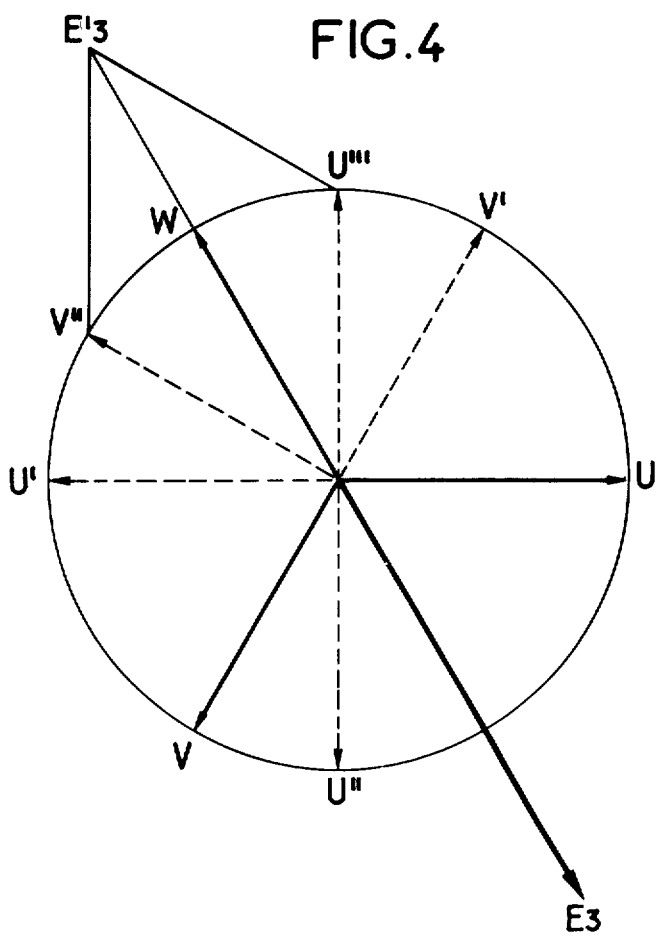
FIG. 4 is a vector diagram of the phase U, V and W (FIGS. 1 and 3), which shows the position of the reference signal which is used for firing the thyristor 3 of FIG. 1.

With reference to FIG. 4, the relative position of the voltages of the phases U, V and W have been shown by vectors U, V and W.

If the vector U is taken, the summing circuit 14 causes a phase shift of $\pi$ leading to U', the integrator 11 causes a phase shift of $\pi/2$ leading to U'', the inverter 17 causes a phase shift of $\pi$ leading to U'''. In the same way, the vector V has a phase shift successively to V' and V''. The circuit 20 calculates the sum U''+V'' leading to $E'_3$ and effects a phase shift of $\pi$ leading to $E_3$ which is phase shifted by 60° in advance of V. This reference signal $E_3$ is then compared by a differential amplifier 23 with a control voltage $U_c$ whose value will determine the firing angle $\alpha$ of the thyristor 3. The output of the differential amplifier 23 is connected to the trigger of the thyristor 3. In the same way, the trigger of the thyristor 5 is controlled by means of a differential amplifier 24 which compares the reference signal $E_5$ with a control signal $U_c$. Lastly, a differential amplifier 25 which compares the reference signal $E_1$ with a control $U_c$ controls the trigger of the thyristor 1.

If the order of the phases is inverted, in other words if there is an inversion of the direction of rotation of the machine, this is the equivalent of saying that, with respect to the firing of the thyristor 3 for example, the phases U and W have exchanged their positions in the diagram in FIG. 4.

To obtain the suitable signals $E_3$ and $E'_3$, it is seen that whereas $V'''$ remains unchanged, it is sufficient to replace the signal $U'''$ by the signal $W'''$ at the input of the amplifier 20. The exchanges to be effected at the inputs of amplifiers 21 and 22 would be determined in the same way.

This set of exchanges at the inputs of the three above-mentioned amplifiers is effected easily by means of six analog gates controlled in groups of three, as a function of the true order of the phases, U-V-W, or W-V-U.

The thyristors 4, 2 and 6 are respectively controlled by means of differential amplifiers 26, 27 and 28 which compare the control voltage $U_c$ with the reference signals $E_4$, $E_2$ and $E_6$. The reference signals $E_4$, $E_2$ and $E_6$ come respectively from the signals $E_3$, $E_5$ and $E_1$ through the inverter circuits 29, 30 and 31 which phase shift the signals $E_3$, $E_5$ and $E_1$ by $\pi$.

In order to improve the reference signals E, which are disturbed at the time of phase switching and although the integrator circuits 11, 12 and 13 eliminate a large part of these disturbances, it is possible to introduce the electromotive force or the back electromotive force of the machine M rather than the phase voltage, U, V and W into the integrator circuits. Therefore an image is produced of the inductive and ohmic drops of the machine which are inserted with the voltage U, V and W in the summing circuits 14, 15 and 16.

The assembly includes three current transformers 32, 33 and 34. The secondary windings are star connected, the neutral conductor being brought to the potential of zero volt and resistors Xu, Xv, Xw being placed respectively between the neutral conductor and each of the three free terminals of the secondary windings. The voltage at the terminals of each resistor is respectively applied to an input of the summing circuits 14, 15 and 16. These voltages are differentiated by means of circuits 35, 36 and 37 and respectively sent on a second input of the summing circuits 14, 15 and 16.

In practice, it is necessary to connect a resistor z in parallel with the integrators 11, 12 and 13; this resistor normally has a high resistance to prevent the inadvertent drifting of the integrators under the effect of DC interference voltages. In the present case, a resistor Z which has a lower resistance than that normally necessary to limit the drifting of the integrators is used; in this way, they will be affected by a phase shift which increases for low frequency. This effect is beneficial if it is required to have a clearance angle $\gamma$ which increases when the frequency decreases when the bridge is operating as an inverter.

It is stated for reference that the clearance angle is such that $\alpha + \mu + \gamma = 180°$ where $\alpha$ is the priming angle and $\mu$ is the angle which corresponds to the duration of the phase switching.

The signals $U''$, $V''$ and $W''$ at the outputs of the integrators are in the form $V/\omega$, V being the simple phase voltage and $\omega$ being the angular frequency and are therefore images of the flux. Due to this fact, it is possible to use these signals for regulating the energisation of the machine M. To do this, it is sufficient to rectify these signals, to sum them and to compare the sum obtained with a fixed reference.

Figure 5:
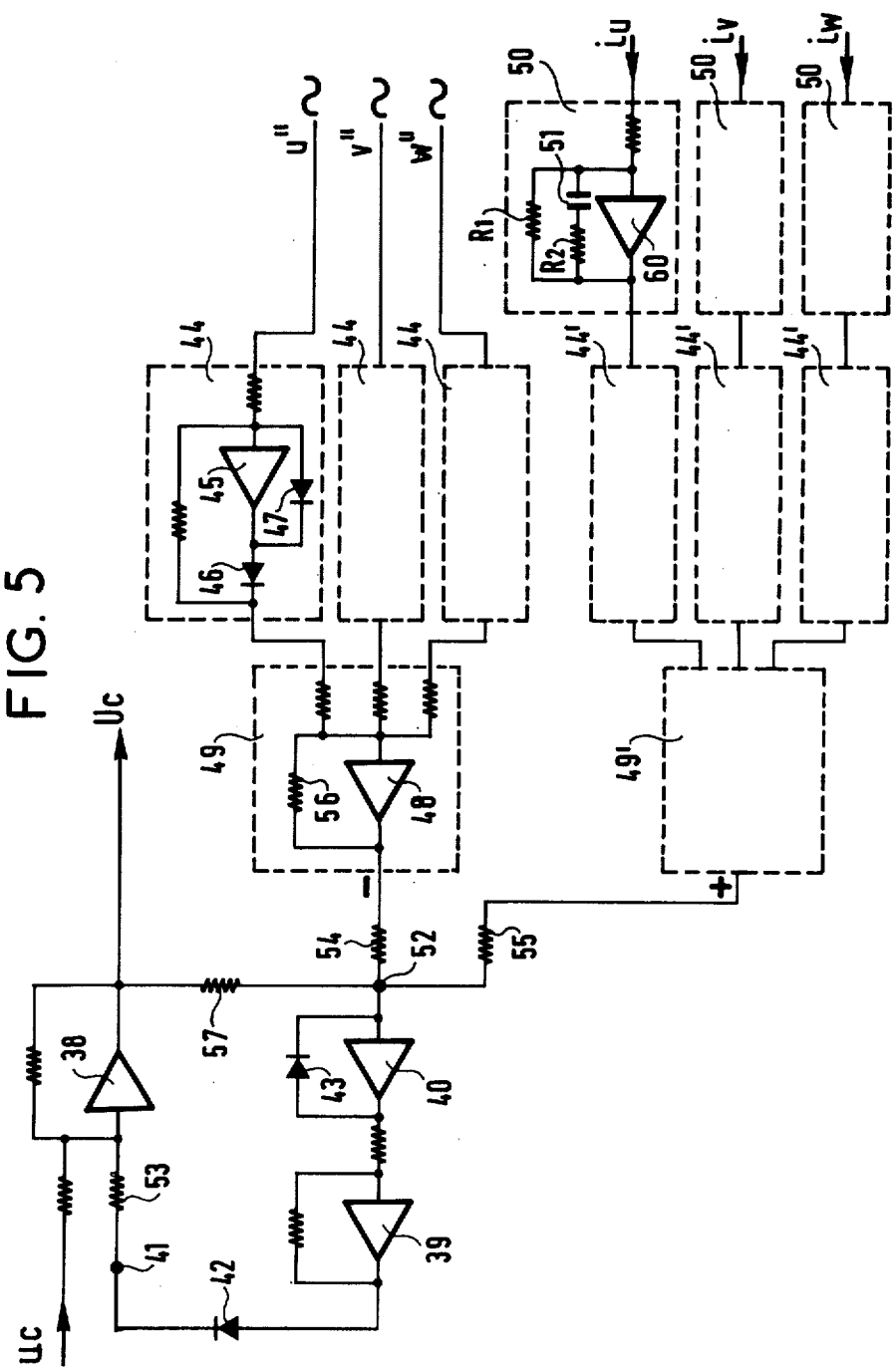
FIG. 5 shows schematically a device for controlling the signal $U_c$ for controlling a thyristor of the bridge.

A device for controlling the control voltage $U_c$ as a function of the current transitted by the bridge and of the simple voltages of the machine will now be described with reference to FIG. 5. Such a device is known and used in devices for controlling Graetz rectifier bridges which operate at a fixed frequency. A second aim of the invention is to add to this known control device an extra device in the case of the present invention where the bridge operates at a variable frequency. In this figure, the signal $U_c$ is the control signal applied to a comparator such as the comparator 23 for example. By convention, it has been decided that the bridge PM operates as an inverter when $U_c$ is positive.

The assembly comprises firstly a regulator which limits the signal $U_c$ and which is constituted by three operational amplifiers 38, 39 and 40. The amplifier 38 is connected as an inverting summing device; it adds the voltage of a signal $U_c$ to the voltage at 41; the amplifier 39 is connected as an inverter and its output is connected to the input of the amplifier 38 via a diode 42.

The amplifier 40 is also connected as an inverting summing device with a practically infinite gain, its output being connected to the input only via a diode 43; further, the output of the amplifier 38 is connected to the input of the amplifier 40.

The assembly then includes means for control by the voltage of the machine M. For this purpose, the voltages $U''$, $V''$ and $W''$ are taken (see FIG. 3) and rectified by means of the circuit shown inside one of the rectangles in dashed lines 44 which rectifies the negative half cycles at the input and delivers a zero voltage for the positive half cycles at the input. This circuit comprises an operational amplifier 45 which includes a diode 46 at the output and a diode 47 between the output and the input. There is therefore always a positive signal at the outputs of these circuits. The three signals at the output of the rectangles 44 are then summed and inverted in the box 49 which includes an operational amplifier 48 which operates as an inverting summing device. There is therefore at the output always a negative voltage which is an image of the voltage at the terminals of the machine M.

Lastly, the assembly also includes means for control by the current flowing through the bridge. For this purpose, the signals are taken off at the output of the resistors $X_u$, $X_v$ and $X_w$ which represent currents $i_u$, $i_v$ and $i_w$ which flow in the three phases of the machine M and they are made to undergo the same transformations: rectification and summing by the units inside the boxes 44' and 49', which are identical to those described previously but also, and in accordance with the invention, the amplitude of these signals is modified before they are rectified, by means of the circuit shown in one of the rectangles 50. This circuit includes an operational amplifier 60 provided in negative feed-back with a corrector circuit such that the gain of the assembly is an inverse function of frequency.

In the example described, the corrector circuit includes a capacitor 51 and a resistor $R_2$ in series, the assembly being connected in parallel with a resistor $R_1$.

By means of this device, a signal, which is an inverse function of frequency, appears at the output, thus making it possible to increase fictitiously the signals $i_u$, $i_v$, and $i_w$ at low frequencies and hence to increase the correction made by the rectifier and summing circuits of the units 44' and 49', the diodes 46 and 47 having the opposite direction in the circuits 44' to the one they had in the circuits 44.

The operation of the assembly is as follows:

When the voltage is negative at the summing point 52 of the amplifier 40, the output of this amplifier is positive and the output of the following amplifier 39 is negative; the diode 42 therefore blocks this voltage which is zero at 41 and only the signal $U_c$ affects the amplifier 38 and no correction is applied to this signal which only changes sign.

In contrast, if the summing point 52 is positive, the output of the amplifier 39 is also positive and a voltage appears at the terminals of the input resistor 53 of the amplifier 38. On account of the practically infinite gain of the amplifier 40, and of the sufficiently low value given to the resistor 53, the signal at the point 41 becomes privileged in relation to the signal $U_c$. The balance is then established so that the signal $U_c$ will be equal to the algebraic sum of the voltage and current images produced by means of the resistors 54 and 55.

For the point 52 to become positive, it is sufficient for the positive voltage at the terminals of the input resistor 57 of the amplifier to exceed the absolute value of the negative voltage which results from the sum of the voltages at the terminals of the resistors 54 and 55. The assembly of adjustment resistances of the amplifiers are calculated for this to occur either if the voltages u'', v'', w'' decrease too much or if the currents $i_u$, $i_v$, $i_w$ increase too much, or if the frequency of these currents is too low, or if the signal $U_c$ becomes too negative.

Of course, the example described has been given only by way of illustration having no limiting character and, without going beyond the scope of the invention, some components of the device could be replaced by other equivalent components which perform the same function. In particular, the description has been given for the case of a three-phase system, but the dispositions indicated can be applied to a system which has any number of phases.

What is claimed is:

1. A control device for controlling a Graetz rectifier bridge for connection by its AC terminals to a synchronous polyphase machine which operates at variable speed, the voltage at each of said AC terminals being substantially proportional to its frequency, said Graetz rectifier bridge being composed of a plurality of thyristors grouped in pairs, one pair for each of said AC terminals, each of said thyristors being separately fired by said control device, said control device comprising:
   means for supplying a control signal $U_c$ chosen as a function of the required firing angle α for said thyristors to be fired,
   means connected to said AC terminals for generating sinusoidal phase reference signals for each phase whose amplitudes are made independent from the operating frequency of said Graetz rectifier bridge, and
   comparing means connected to receive said control signal $U_c$ and said sinusoidal phase reference signals for generating the separate firing pulses for each of said thyristors.

2. A control device for controlling a Graetz rectifier bridge according to claim 1, wherein said means for generating sinusoidal phase reference signals comprises:
   means for generating signals which are images of the simple voltages of each of the phases of said machine connected to said AC terminals,
   a plurality of integrator circuits, each connected to receive one of said image signals, and
   a plurality of phase shift circuits, each connected to the output of a respective one of said integrator circuits and producing an output which is phase shifted by π/3 in advance in relation to the voltage of the phase for which the corresponding one of said reference signals is intended and which includes the thyristor to be fired.

3. A control device for controlling a Graetz rectifier bridge according to claim 2, wherein each of said integrator circuits comprises a negative feed-back resistor such that the integrators will be affected with a forward phase shift which increases when the frequency decreases.

4. A control device for controlling a Graetz rectifier bridge according to claim 2 which further comprises:
   a plurality of summing circuits, each connected to the input of a respective one of said integrator circuits; and
   means for producing, for each phase connected to said bridge, an image signal of the inductive drop of said phase and an image signal of its ohmic drop, these two image signals being introduced into a respective one of said integrator circuits by means of a corresponding one of said summing circuits toegether with said image signal of the voltage of the same phase taken at said AC terminals of said bridge.

5. A control device for controlling a Graetz rectifier bridge according to claim 4, wherein the image signals of the ohmic and inductive drops are obtained respectively for each phase by means of a current transformer whose secondary winding is connected to a resistor having one of its terminals placed at a reference potential and the other of its terminals connected to a differentiating circuit.

6. A control device for controlling a Graetz rectifier bridge according to claim 2, which further comprises:
   a plurality of rectifier circuits, each connected to the output of a respective one of said integrator circuits and producing a rectified output,
   summing means connected to said plurality of rectifier circuits for summing said rectified output, and
   regulator means connected to said summing means for comparing the sum to rectified outputs with a fixed reference for regulating said control signal $U_c$.

7. A control device for controling a Graetz rectifier bridge according to claim 1, which further comprises:
   means for forming the sign-inverted image signal of the sum of the rectified polyphase voltages of said machine,
   means for generating an image signal of the direct current $I_c$ flowing through said bridge which image signal increases in accordance with an inverse function of frequency, and
   substitution means for summing said sign-inverted image signal and said image signal of the direct current $I_c$ and substituting the summed signal for said control signal $U_c$ when its sign corresponds to the operation of said machine as a motor.

8. A control device for controlling a Graetz rectifier bridge according to claim 7, wherein said means for generating an image signal of the direct current $I_c$ is produced from image signals of the currents of each of the phases of the machine and includes means for modifying the amplitude and rectifying each image signal before being added to the others.

* * * * *